(12) United States Patent
Purton

(10) Patent No.: US 10,893,774 B2
(45) Date of Patent: Jan. 19, 2021

(54) ESPRESSO MILK FROTHER PROBE

(71) Applicant: William Westmore Purton, Robe (AU)

(72) Inventor: William Westmore Purton, Robe (AU)

( * ) Notice: Subject to any disclaimer, the term of this patent is extended or adjusted under 35 U.S.C. 154(b) by 227 days.

(21) Appl. No.: 15/746,175

(22) PCT Filed: Jul. 18, 2016

(86) PCT No.: PCT/AU2016/000256
§ 371 (c)(1),
(2) Date: Jan. 19, 2018

(87) PCT Pub. No.: WO2017/011853
PCT Pub. Date: Jan. 26, 2017

(65) Prior Publication Data
US 2018/0213968 A1     Aug. 2, 2018

(30) Foreign Application Priority Data

Jul. 22, 2015   (AU) ................................ 2015902907

(51) Int. Cl.
*A47J 31/44*         (2006.01)

(52) U.S. Cl.
CPC ....... *A47J 31/4489* (2013.01); *A47J 31/4425* (2013.01)

(58) Field of Classification Search
CPC ............... A47J 31/4489; A47J 31/4425; A47J 31/4496; A01J 11/04; A23C 9/1524; A23C 2210/30
See application file for complete search history.

(56) References Cited

U.S. PATENT DOCUMENTS

| | | | |
|---|---|---|---|
| 4,852,473 A * | 8/1989 | Azpitarte Bolivar | ....................... A47J 31/4489 99/293 |
| 5,769,135 A | 6/1998 | Mahlich | |
| 6,644,177 B1 * | 11/2003 | Hsu | ..................... A47J 31/4489 99/287 |
| 2009/0255415 A1 * | 10/2009 | Cheng | ..................... A47J 43/07 99/453 |
| 2010/0154648 A1 | 6/2010 | Angeletti | |
| 2015/0223634 A1 | 8/2015 | Moscani et al. | |

FOREIGN PATENT DOCUMENTS

| | | | | |
|---|---|---|---|---|
| EP | 2389848 A1 * | 11/2011 | ......... | A47J 31/4489 |
| EP | 2789276 | 10/2014 | | |
| WO | 2011160818 | 12/2011 | | |
| WO | 2014165911 | 10/2014 | | |
| WO | 2016079680 | 5/2016 | | |

OTHER PUBLICATIONS

Corresponding International Search Report for PCT/AU2016/000256 dated Aug. 15, 2016. WO.

* cited by examiner

*Primary Examiner* — Matthew P Travers
(74) *Attorney, Agent, or Firm* — The Belles Group, P.C.

(57) ABSTRACT

A milk frothing apparatus which includes a steam probe which consists of an inner steam tube surrounded by an outer tube spaced annularly from the inner tube with a nozzle mounted on the end of the outer tube adjacent the outlet end of the inner tube. The air gap between the inner and outer tubes insulates the outer tube from the heat generated in the inner tube during the steam cycle. By using stainless steel the milk does not stick to the cool outer tube surface and no cleaning of the outer surface of the probe is necessary. The steam itself keeps the inner surfaces of the probe clean.

18 Claims, 2 Drawing Sheets

ESPRESSO MILK FROTHER PROBE

PRIORITY

Priority is claimed as a national stage application, under 35 U.S.C. § 371, to international patent application No. PCT/AU2016/000256, filed Jul. 18, 2016, which claims priority to Australian patent application 2015902907, filed Jul. 22, 2015. The disclosures of the aforementioned priority applications are incorporated herein by reference in their entirety.

This invention relates to improvements in milk frothers for espresso machines.

BACKGROUND TO THE INVENTION

There is a World-wide trend in both developed and developing countries for increasing coffee consumption. The European styles of serving coffee with milk are by far the most popular—in particular, caffe latte, cappuccino and flat white coffee It is more time-consuming to produce the European styles of coffee as the milk has to be heated with the infusion of steam to create a frothiness or foam which is an essential component for the overall taste, mouth-feel and appearance of the coffee style.

The present inventor developed an automatic milk frother disclosed in WO2014/165911 which included a sensor to determine the depth of milk in a jug; the steam probe or jug support being movable preferably driven by stepper motor, to maintain the tip of the probe below the milk surface; a temperature sensor to monitor the temperature of the milk in the jug; a micro controller which starts the process; maintains the position of the steam probe relative to the milk surface.

It is an object of this invention to improve the performance of this device.

BRIEF DESCRIPTION OF THE INVENTION

To this end the present invention provides a milk frother that includes a steam probe which consists of an inner steam tube surrounded by an outer tube spaced annularly from the inner tube with a nozzle mounted on the end of said outer tube adjacent the outlet end of said inner tube.

The air gap between the inner and outer tubes insulates the outer tube from the heat generated in the inner tube during the steam cycle. By using stainless steel the milk does not stick to the cool outer tube surface and no cleaning of the outer surface of the probe is necessary. The steam itself keeps the inner surfaces of the probe clean.

Thus the probe of this invention may be used in the milk frother disclosed in WO2014/165911 the contents of which are incorporated herein by reference.

In this milk frother the temperature of the milk is sensed by a temperature sensor that monitors the temperature of the bottom wall of the milk jug. To improve the accuracy of the temperature sensing a proprietary jug is used in which the base and lower wall of the jug is matt black.

DETAILED DESCRIPTION OF THE INVENTION

Figure 1:
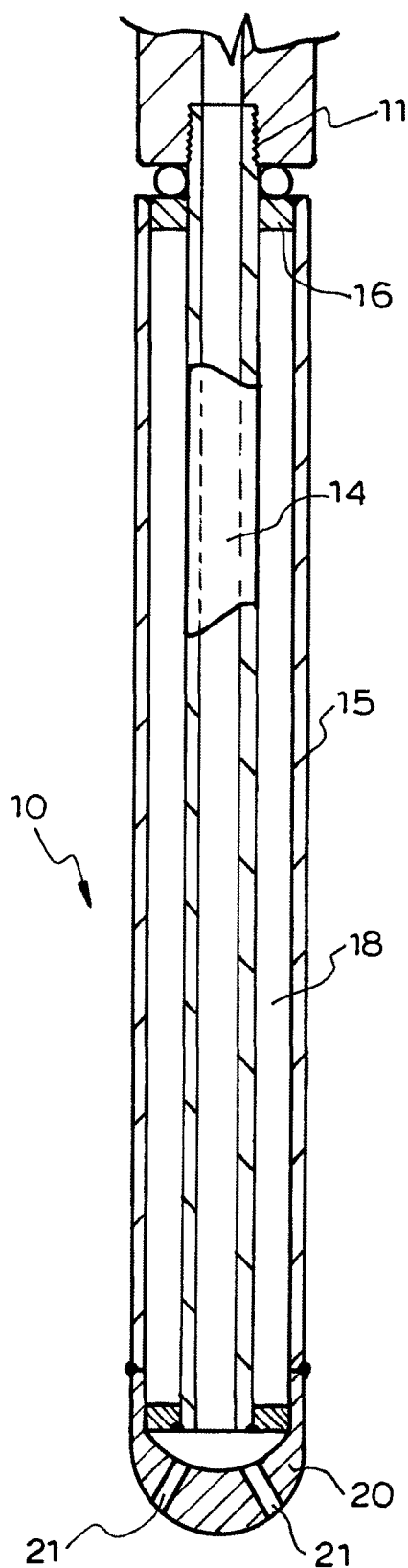
Figure 2:
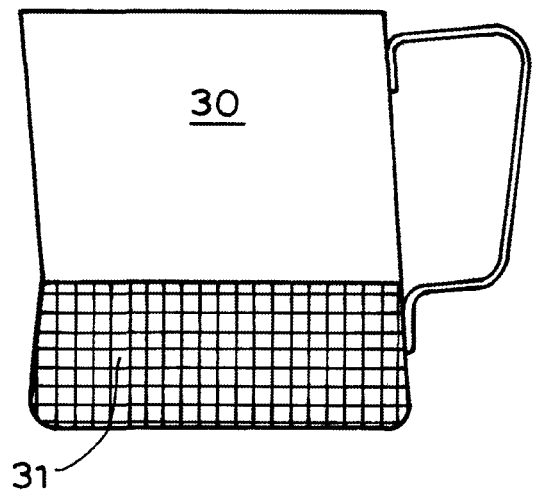
Figure 3:
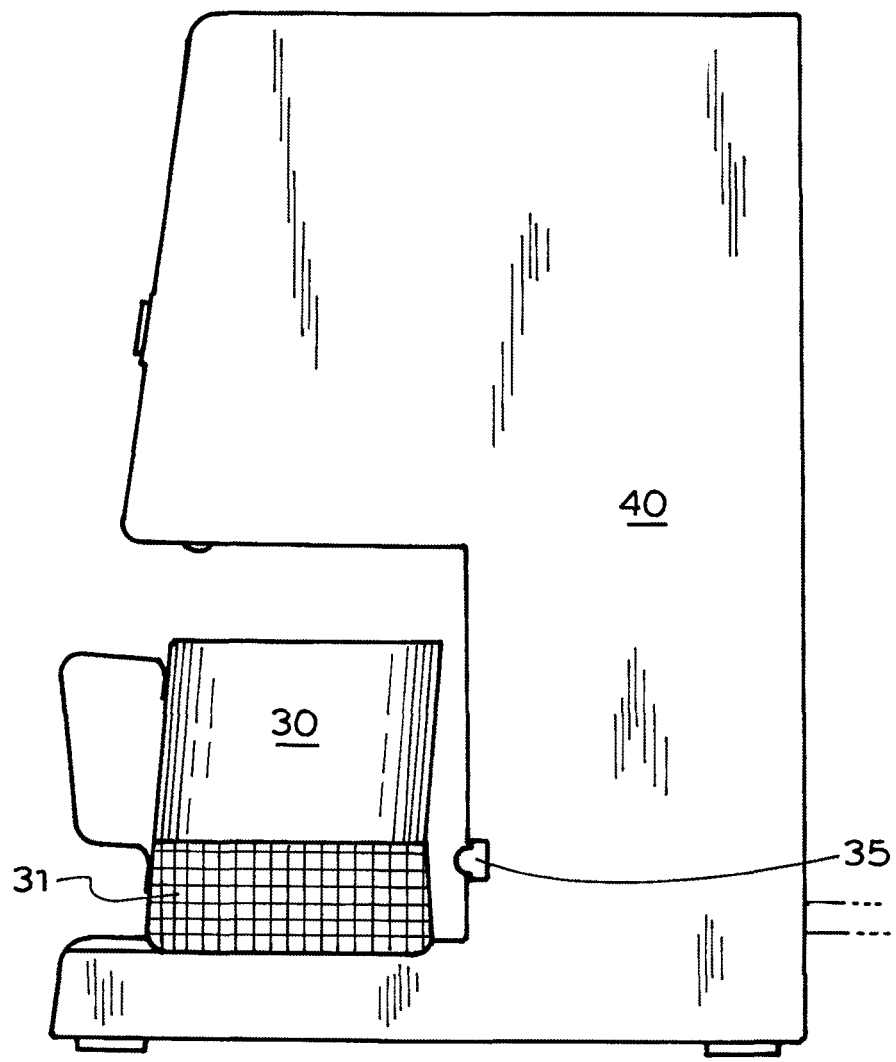

Preferred embodiments of the invention will now be described with reference to the drawings in which FIG. 1 is a schematic view of the tip of the steam probe;
FIG. 2 illustrates a side view of the milk jug of this invention;
FIG. 3 illustrates the position of a non-contact temperature sensor.

The embodiments described may be used in the milk frother as described in WO2014/165911.

As shown in FIG. 1 the milk probe 10 attaches to the steam line 11 by a screw thread connection. The probe consists of a double wall tube. The inner tube 14 attaches to the steam line and the outer tube 15 is concentric with the inner tube 14 and spaced therefrom by spacers 16. The air space 18 separates and insulates the outer tube 15 from the inner tube 14. This air space may be filled with any insulating material as an alternative insulator to air. The tip 20 is welded or screwed to the end of outer tube 15 adjacent the end of the inner tube 14. The tip 20 incorporates steam outlets 21. Because the temperature of the outer tube is kept low during the steam injection step, the milk does not adhere to the surface of the outer wall and no cleaning of that surface is needed between steam injections. As is conventional in the design of milk probes, it may be curved or serpentine along its length.

The temperature of the milk in the jug 30 is sensed by an infrared sensor 35 in the body of the milk frother 40. The lower surface 31 of the jug 30 is coated to have a matt black surface to ensure an accurate temperature reading.

A preferred coating is Black Chromium which is slightly harder than nickel chrome and gives a matte black finish which is able to withstand the normal washing process. The stainless steel jugs can also be spray-painted with matte black epoxy coatings or materials such as "ironstone" a non-stick coating—

Whatever the material of choice is, it is preferably thin to allow the fastest transfer of heat. Coatings may be applied using Vapour deposition or Plasma enhanced chemical vapour deposition use a direct current. A two-stage process is required for anodizing the surface: Ion Vapour deposition and then anodization in the normal way.

From the above it can be seen that this invention provides a unique means of increasing barista productivity without losing the quality of milk frothing required for premium espresso coffee products. Those skilled in the art will realise that this invention may be implemented in embodiments other than those described without departing from the core teachings of this invention.

The invention claimed is:

1. A milk frothing apparatus comprising a steam probe which comprises an outer steam tube, an inner steam tube surrounded by said outer steam tube and spaced annularly from the outer steam tube, and a one-piece nozzle welded directly to an outlet end of said outer steam tube adjacent an outlet end of said inner steam tube, wherein the nozzle extends substantially continuously from the outer steam tube to provide a substantially continuous parallel outer surface of the steam probe and ends in a bulbous shaped tip with steam outlets located within a radial extent equal to a radius of the outer steam tube to facilitate cleaning of a surface of the outer steam tube.

2. The milk frothing apparatus as claimed in claim 1 in which the steam probe is made from stainless steel.

3. The milk frothing apparatus as claimed in claim 1, further comprising a jug, a jug support, and a non-contact temperature sensor, wherein the non-contact temperature sensor is located adjacent the jug support to monitor a temperature of an external surface of the jug, and wherein a lower portion of the external surface of the jug is matte black.

4. The milk frothing apparatus as claimed in claim 1 wherein the outer steam tube comprises an inlet end, and wherein the inner steam tube comprises an inlet portion that protrudes from the inlet end of the outer steam tube.

5. The milk frothing apparatus as claimed in claim 4 wherein the inlet portion of the inner steam tube comprises screw threads configured for directly coupling the inlet portion of the inner steam tube to a steam line.

6. The milk frothing apparatus as claimed in claim 4 further comprising at least one spacer extending from an outer surface of the inner steam tube to an inner surface of the outer steam tube at the inlet end of the outer steam tube.

7. The milk frothing apparatus as claimed in claim 6 wherein the at least one spacer comprises a top surface and a bottom surface, and wherein the top surface is flush with the inlet end of the outer steam tube.

8. The milk frothing apparatus as claimed in claim 4 wherein the inner steam tube comprises an outlet portion that protrudes from the outlet end of the outer steam tube, the nozzle surrounding the outlet portion of the inner steam tube.

9. The milk frothing apparatus as claimed in claim 8 further comprising at least one spacer extending from an outer surface of the outlet portion of the inner steam tube to an inner surface of the nozzle to maintain a space between the inner steam tube and the nozzle.

10. The milk frothing apparatus as claimed in claim 1 wherein the nozzle comprises an inner surface having a linear portion and a concave portion, and wherein the outlet end of the inner steam tube lies substantially in a plane that intersects the inner surface of the nozzle at a junction between the linear and concave portions.

11. The milk frothing apparatus as claimed in claim 1 wherein the outer steam tube comprises an inlet end, and wherein a portion of the inner steam tube protrudes from the outlet end of the outer steam tube, and wherein the nozzle surrounds the portion of the inner steam tube that protrudes from the outlet end of the outer steam tube.

12. The milk frothing apparatus as claimed in claim 1 wherein an entirety of an outer surface of the outer steam tube is exposed.

13. The milk frothing apparatus as claimed in claim 1 wherein an end of the nozzle abuts directly against the outlet end of the outer steam tube such that there is no overlap between the nozzle and the outer steam tube.

14. A steam probe for a milk frothing apparatus, the steam probe comprising:
    an outer steam tube;
    an inner steam tube surrounded by said outer steam tube and spaced annularly from the outer steam tube; and
    a one-piece nozzle welded directly to an outlet end of said outer steam tube adjacent an outlet end of said inner steam tube, wherein the nozzle extends substantially continuously from the outer steam tube to provide a substantially continuous outer surface of the steam probe and ends in a bulbous shaped tip with steam outlets; and
    wherein the steam probe is made from stainless steel.

15. A probe as claimed in claim 14 wherein the bulbous shaped tip also forms a steam release chamber within the bulbous shaped tip across a width of the outer steam tube.

16. A steam probe for a milk frothing apparatus, the steam probe comprising:
    an outer steam tube comprising an inlet end and an outlet end;
    an inner steam tube surrounded by said outer steam tube and spaced annularly from said outer steam tube, the inner steam tube comprising an inlet portion that protrudes from the inlet end of the outer steam tube and an outlet portion that protrudes from the outlet end of the outer steam tube;
    a nozzle coupled to the outlet end of the outer steam tube, the nozzle surrounding the outlet portion of the inner steam tube which protrudes from the outlet end of the outer steam tube; and
    wherein an end of the nozzle abuts directly against the outlet end of the outer steam tube such that no portion of the nozzle surrounds or is surrounded by the outer steam tube.

17. The steam probe as claimed in claim 16 wherein the inlet portion of the inner steam tube comprises an outer surface having screw threads configured for directly coupling the inlet portion of the inner steam tube to a steam line.

18. The steam probe as claimed in claim 16 wherein an outer surface of the nozzle and an outer surface of the outer steam tube are substantially flush so as to form a substantially smooth continuous uninterrupted outer surface of the steam probe.

* * * * *